United States Patent [19]
Duerksen

[11] 3,800,556
[45] Apr. 2, 1974

[54] POWER SHAFT COUPLING
[75] Inventor: Arnold Duerksen, Salinas, Calif.
[73] Assignee: Cochran Western Corporation, Salinas, Calif.
[22] Filed: Nov. 29, 1972
[21] Appl. No.: 310,207

[52] U.S. Cl............................ 64/6, 64/1 C, 64/9, 64/23, 180/14.5, 403/364, 403/339
[51] Int. Cl............................................. F16d 3/00
[58] Field of Search ........... 64/6, 1 C, 1 R, 4, 3, 23, 64/10, 9; 403/364, 339, 363, 393; 180/14 B, 14.5

[56] References Cited
UNITED STATES PATENTS

| | | | |
|---|---|---|---|
| 607,607 | 7/1898 | Rimmelin............................ | 403/364 |
| 2,597,526 | 5/1952 | Kessler.................................... | 64/4 |
| 2,626,000 | 1/1953 | Yergens................................... | 64/4 |
| 3,362,235 | 1/1968 | Wirth et al............................. | 64/6 |

FOREIGN PATENTS OR APPLICATIONS

| | | | |
|---|---|---|---|
| 1,145,864 | 5/1955 | Germany.................................. | 64/6 |

Primary Examiner—Benjamin W. Wyche
Assistant Examiner—Randall Heald
Attorney, Agent, or Firm—Flehr, Hohbach, Test, Albritton & Herbert

[57] ABSTRACT

A power shaft coupling particularly adapted for trailing vehicles whereby a through drive shaft connection may be automatically obtained with respect to two or more trailing vehicles, or between a tractor and a trailing vehicle. The power shaft coupling includes pairs of elongate square bars forming part of complementary and mating coupler means. Guide means on the free ends of each pair of square bars serve to guide the pairs of elongate square bars of adjacent coupler means into complementary nested engagement wherein the bars of one coupler means slide into aligned relation within outward and oppositely facing slots of the other coupler means. Each trailing vehicle can have complementary coupler means universally connected at either end of a through power shaft with means to align the couplings with the tow bars, also provided at either end of the trailing vehicle.

18 Claims, 3 Drawing Figures

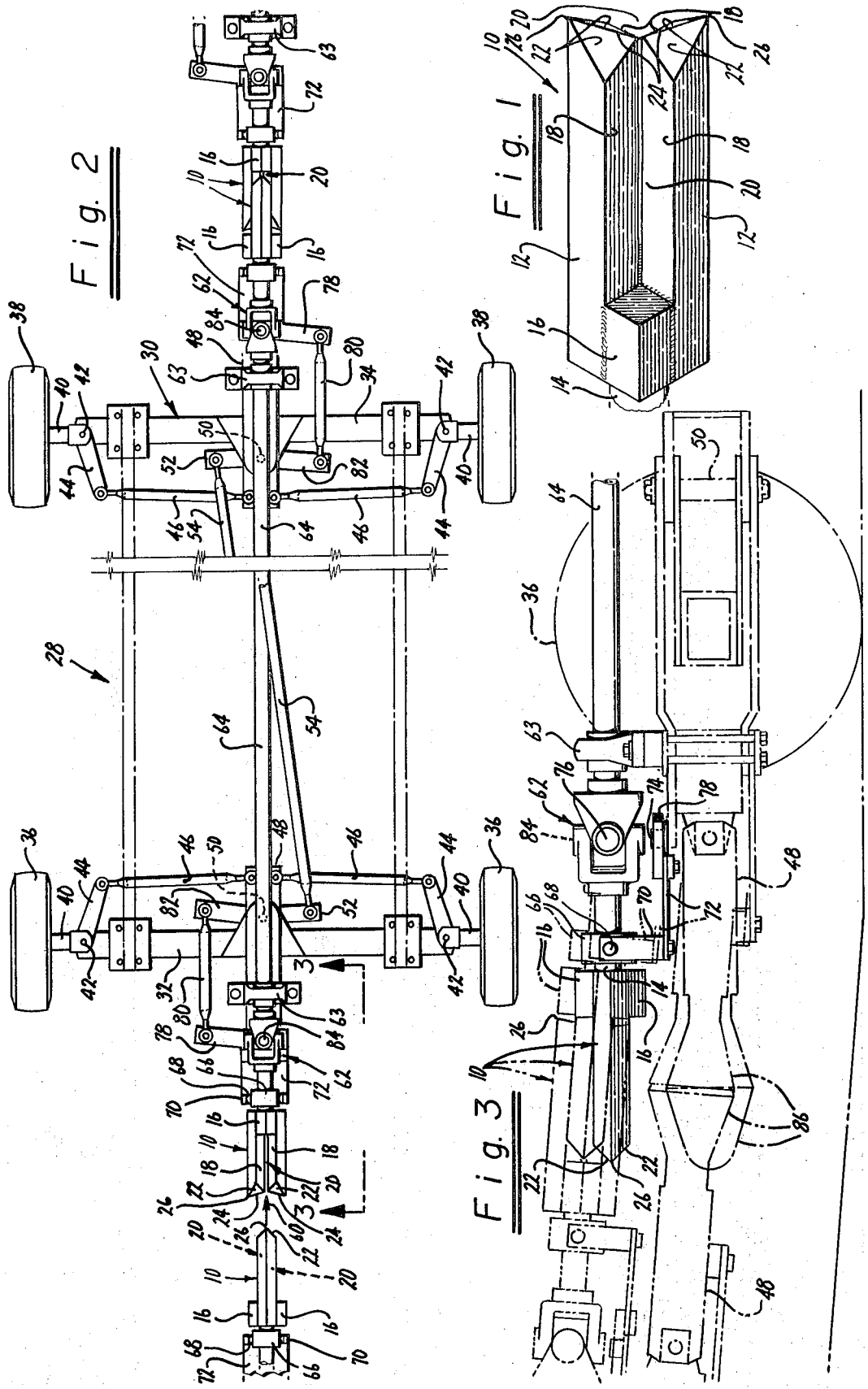

POWER SHAFT COUPLING

BACKGROUND OF THE INVENTION

Various arrangements have heretofore been utilized for imparting power to a trailing vehicle connected with a tractor or like powered vehicle. Heretofore, coupling means for effecting power shaft couplings between a tractor and a plurality of trailing vehicles have been complicated in construction and difficult to use. For example, the operator usually must dismount and manually connect the driven and power take off shafts. Moreover, power shaft couplings have not always been effectively utilized in an uneven terrain or with relatively long trains of coupled vehicles. Accordingly, the provision of a simplified power shaft coupling which makes possible the rapid automatic coupling of a through drive shaft between a tractor and one or more trailing vehicles, and which will function effectively in all types of trailing maneuvers, is highly to be desired.

SUMMARY OF THE INVENTION

This invention relates generally to the field of power shaft couplings, and more particularly to coupling means to affect automatic power shaft coupling between the drive shaft of a tractor and one or more trailing vehicles. It specifically relates to an automatic power shaft coupling intended to be used on a trailing vehicle equipped with an automatic quick coupler on a tow bar, whereby automatic coupling of a plurality of trailing vehicles can be rapidly effected.

In general, it is an object of the present invention to provide an improved power shaft coupling for the purpose described.

It is another object of the invention to provide a trailing vehicle with an automatic power shaft coupling whereby it is possible to quickly couple a train of such trailers to obtain a through drive shaft connection therebetween with respect to a powered draft vehicle.

It is yet another object of the invention to provide a power shaft coupling which will automatically fit together with a complementary mating coupling, to thereby effect a through shaft power coupling.

It is a particular object of the invention to provide a power shaft coupling in the form of complementary mating pairs of elongate square bars having guide means on the free ends thereof, whereby the coupling function is automatically and rapidly obtained.

As a brief statement of the invention, I provide an automatic shaft coupling in the form of two square bars positioned adjacent and horizontally parallel with one another and having guide means in the form of pointed bar ends formed of compound angles. In a preferred embodiment, the elongate square bars are joined together at one end by relatively shorter square bars nested within and forming a solidified mass with inner portions of the elongate square bars. The coupling means is non-rotatably mounted at the joined end with a rotatable stub shaft which has an axis of rotation along a line between the elongate square bars. The positioning of the elongate square bars is such that, in cross section, the corners of the squares are opposite each other and slightly separated so that adjacent longitudinal surfaces of the elongate square bars define two-sided outwardly and oppositely facing pairs of slots. As the coupling means on adjacent stub shafts are substantially equivalent, and thus complementary, the elongate square bars of adjacent coupling means are easily guded by the pointed ends into a complementary nested engagement wherein the elongate bars of one coupling member are received in nested driving relationship within the outwardly and oppositely facing slots of the square bars of the other coupling member.

In a vehicular trailer construction, the stub shafts of each coupling means are rotatably connected by appropriate universal connections to opposite ends of a through drive shaft. The angular movements of the stub shafts ae controlled by tow bars also provided at either end of the trailer vehicle, through linkage members connecting the two together. Variations in vertical alignment between the trailers, for example, during cresting, are compensated by flexible or leaf spring supports for the universally connected stub shafts. Accordingly, when the two trailers are brought together with their tow bars in concentric alignment, the coupling means on the two trailers are automatically coupled together to provide an automatic power shaft coupling which is effective throughout subsequent trailing functions.

Other features and advantages of the invention will be apparent from the following description taken in conjunction with the drawings.

BRIEF DESCRIPTION OF THE DRAWINGS

FIG. 1 is a view in perspective of power shaft coupling means in accordance with the present invention.

FIG. 2 is a plan view, on a reduced scale, of a trailer vehicle in accordance with the invention, equipped with the power shaft coupling means of FIG. 1.

FIG. 3 is an enlarged sectional view along the lines 3—3 of FIG. 2.

DESCRIPTION OF THE PREFERRED EMBODIMENT

Referring to FIG. 1, reference numeral 10 generally represents power shaft coupling means in accordance with the invention. As illustrated, the coupling means 10 generally comprises a pair of the elongate square bars 12 mounted in parallel relationship with respect to a rotatably stub shaft 14, and in aligned juxaposition on either side of the axis of rotation of the stub shaft. In the preferred embodiment illustrated, the elongate bars 12 are joined to one another by means of relatively shorter square bars 16 which are nested within and welded or otherwise secured to the elongate bars 12. Such arrangement provides a solidified mass of generally rectangular cross-section which facilitates attachment to the stub shaft 14. For example, the joined section of the bars can be appropriately bored and keyed at its center to non-rotatably receive the stub shaft 14.

In accordance with the invention the pairs of elongate square bars 12 are held in parallel axial alignment by the relatively shorter square bars 16, so that adjacent longitudinal surfaces 18 of the bars 12 define oppositely and outwardly facing pairs of slots 20. As generally represented in FIG. 1, each of slots 20 subtends a cross-sectional angle of approximately 90° (derived from the square configuration of the connecting bars 16), with the result that the slots 20 are of the configuration to telescopingly receive the elongate bars 12 of the other similar coupling means 10, in a complementary nested relationship. To facilitate this function, the free ends of the elongate bars 12 are provided with sharpended or pointed ends formed of compound angles, which facilitate the nesting function. Thus, as particularly illustrated in FIG. 1, each free end of the bars 12 is provided with two outwardly facing planar surfaces 22 which intersect to form a corner or line of intersection 24. In the preferred embodiment, the internal angles subtended by the faces 22 will approximate 90°, although somewhat sharper or shallower angles may be employed. To further facilitate the mating function hereinafter described, the corners or lines of intersection 24 preferably subtend an angle of about 60° to 80° with respect to the extended axis of rotation of the coupling and its power shaft 14. This construction insures that the leading points 26 of a particular coupling 10 will initially engage the faces 22 of an opposite coupling means, thereby effecting a degree of rotation so that engagement is easily accomplished. It is also desirable that the lines of intersection 24 for each pair of elongate square bars (also the axis of rotation of the coupler means) fall substantially in the same plane.

FIG. 2 generally represents a trailer vehicle 28 equipped at either end with a coupling means 10. As illustrated, the trailer vehicle includes a chassis 30 supported by axles 32 and 34 for separate pairs of ground engaging wheels 36 and 38. Utilizing conventional Ackerman type steering, each pair of wheels is mounted on stub axles 40 for steerable movement about the king pins 42, in response to pivoting of track arms 44. The latter are pivotally connected to and responsive to track rods 46 which, in turn, are pivotally connected to rearward extensions of tow bars 48 provided at each end of the trailer vehicle. The tow bars 48 are mounted for pivotal steering movements on connecting pins 50, and are steerably connected to each other by means of crank extensions 52 and a common, longitudinally extending connecting rod 54. In general, the connecting rod 54 provides a means linking the tow bars 48 at each end of the vehicle for steering control of the separate pairs of the steerable wheels 36 and 38.

As particularly illustrated in FIG. 2, trailer 28 comprises one of a series of three trailers capable of being coupled by the coupler means 10 to provide a through drive shaft from one end of the trailer train to the other. For this purpose, eacn of the coupler means 10 is complementary or substantially equivalent in constructon to that of the others so that the mating ends will fit together to form the desired shaft coupling. As a practical matter, the square bar arrangement of the coupler means 10 facilitates the assembly of plural coupler means 10 which will be identical in size and shape and which will easily engage in complementary nested engagement. Note the several coupler means 10, and the successive positions of the coupler means shown in the left and right hand portions of FIG. 2. Thus, as illustrated at the left hand portion of FIG. 2, a separate coupler 10 is represented as moving into nested engagement with the left hand coupler 10 of the trailer 28 (arrow 60). In like fashion, the right hand portion of FIG. 2, illustrates a nested, coupled arrangement of the separate couplers 10. As previously indicated, each of the coupler means 10 is rotatably connected to a stub shaft 14 which, in turn, is rotatably and pivotally connected through a universal connection 62 to a through drive shaft 64. The latter is supported on the trailer frame by journal bearings 63 and extends from one end to the other of the trailer 28.

As particularly illustrated in FIGS. 2 and 3, each coupler means is supported in such fashion that its movements are controlled by movements of its sub-adjacent control bar 48. Specifically, each coupler means 10 is provided with a movable journal bearing 66 mounted by gimbal pins 68 within a yoke bracket 70, which, in turn, is supported on the chassis or frame by means of a flat spring 72. As particularly shown in FIG. 3, the journal bearing 66 is mounted on the spring 72 for flexing in a vertical direction about a pivot or point of attachment 74 on the frame. The latter is immediately below the horizontal axis 76 of the universal connection 62, thus insuring parallelism within the vertically movable linkage. As shown in FIG. 2, the flat spring 72 is provided with a bell crank extension 78 so as to be pivotally movable in a horizontal plane about the pivot 74, in response to movements of a drag link 80 connected to a similar crank arm 82 on the rearward extension of the tow bar 48. The pivot 74 for the crank arm 78 is in vertical alignment with the vertical pin 84 of the universal joint 62, so that substantial parallelism in the horizontal pivotal movements of the coupler means 10 and the tow bar is achieved. As a practical matter, the drag link 80 and crank arms 78 and 82 may be arranged as a trapezium (instead of a parallelagram) so that the tow bar 48 and coupler means 10 (including shaft 14) will pivot approximately about the common center of the curved steering path (i.e., located between the pivot 74 and the connecting pin 50). In this regard, as previously noted, the automatic shaft coupling means of the present invention is intended for use on trailer vehicles equipped with tow bars having automatic quick couplings, as represented at 86. Consequently, upon moving adjacent tow bars 48 to automatic coupling position, the coupling means 10 will be simultaneously pivoted into approximate alignment with the coupling means 10 of the adjacent vehicle.

Assuming a coupled arrangement of the complementary coupling means 10 of adjacent trailing vehicles (for example, as in the right hand portion of FIG. 2), rotary motion derived from the tractor or other powered vehicle is transmitted through the power shaft coupling to the right hand stub shaft 14, journaled in the bearing 66. Rotary motion of the stub shaft 14 is transmitted through the universal connection 62 to the through drive shaft 64 of the trailer vehicle 28. The rotary drive motion of the through drive shaft 64 is similarly transmitted through the universal joint 62 and stub shaft 14 at the opposite end of the trailer to the coupler means at the rear of the trailer vehicle (at the left in FIG. 2). Upon moving the coupler means of a new trailer vehicle to position for automatic coupling, as represented by arrow 60, the coupler means 10 of the latter moves into telescoping engagement with the rear coupler means of the trailer 28 as represented by the dotted line position in FIG. 3. The rear trailer is now automatically connected into the power train and derives power from the through shaft 64, rear stub shaft 14 and rear power coupler means 10. Throughout subsequent steering movements of the trailers (transmitted from the forward tow bars 48 through the longitudinal connecting rods 54 to the rear tow bars 48), power transmission for a through drive shaft connection from forward to rear trailer units (right to left in FIG. 2) is achieved through the complementary mating of the adjacent coupler means 10. During such maneuvers, the couplers 10 will track the horizontal and vertical movements of the tow bars 48 through operation of the linkages to the supporting flat springs 72.

In a coupled train of a trailer vehicles, as generally represented in FIG. 2, each trailing vehicle will operate in substantially the same manner, with the coupler means 10 at each end of the trailing vehicle transmitting rotary power from one end to the other, through the drive shafts 14 and 64. By appropriate drive connections to the through shafts 64 (not shown), each pair of wheels 36, 38 can be caused to operate as a set of driving wheels for its respective trailer. Moreover, such power function can be made reversible as respects the wheels 36, 38 depending upon the direction of movement of the trailing vehicle, thereby increasing the efficiency of the driving medium.

From the foregoing description, it will be apparent that a rapid efficient power shaft coupling is automatically accomplished whenever two trailer vehicles are brought together with their tow bars in concentric alignment, and the automatic coupling means 10 engaged. Due to the linkage arrangement described, the coupling members 10 will at all times be in axial alignment with the steering tow bars 48, regardless of the position of the latter. Horizontal alignment of the coupling means 10 is provided by the flat springs 72, which preferably are pre-loaded to provide horizontal alignment with the tow bar. In trailing operations, the flat spring 72 deflects up or down to coincide with the cresting of the trailers. Steering movements of the tow bar are automatically accommodated by the trapezium linkage 78, 80, 82. Of particular importance is the fact that the coupler means on coming into contact with a mating coupler means 10, will automatically couple regardless of the position of rotation of the individual coupler means. Specifically, the compound angles of the pointed ends of the coupler means will rotate the couplngs into alignment to facilitate sliding or telescoping engagements in the axial direction, thereby effecting the power coupling. Moreover, the construction and arrangement of the coupling means 10, comprising the elongate square bars 12 with guide faces, virtually eliminates any possibility of failure to couple. Specifically, any possibility of maintaining a point to point contact between the leading points 26 of the coupler means would be quite remote, and would be overcome by minor adjustment or movements of the mating parts.

I claim:

1. In a power shaft coupling, means to effect axial and rotary alignment between complementary and mating coupler means, said means including a pair of elongate square bars forming part of each of said coupler means, means non-rotatably positioning said pair of elongate square bars within the coupler means so that each bar is in aligned juxaposition on either side of the axis of rotation of the coupler means, adjacent longitudinal surfaces of each of said pair of elongate square bars defining two-sided outwardly and oppositely facing pairs of elongate slots, and guide means at the free outer ends of each of said pairs of elongate square bars to guide the same into complementary nested engagement with the elongate square bars of a mating coupler means so that each pair of elongate square bars fits into the outwardly and oppositely facing slots of the other.

2. A power shaft coupling as in claim 1 wherein said means non-rotatably positioning each of said pair of elongate square bars within its coupler means includes an additional pair of relatively shorter square bars secured to inner portions of said elongate square bars, and holding the same in substantially parallel alignment.

3. A power shaft coupling as in claim 2 wherein a rotary power shaft is non-rotatably received and secured along the axis of rotation of each coupler means, within a solidified mass comprised of said relatively shorter square bars and inner portions of said elongate bars.

4. A power shaft coupling as in claim 3 wherein said rotary power shaft is a stub shaft secured by means of a universal connection to an elongate power shaft.

5. A power shaft coupling as in claim 1 wherein said guide means at the free outer ends of each of said pair of elongate square bars comprises pointed bar ends formed of compound angles, such pointed bar ends presenting mating surfaces to facilitate guiding of the complementary pairs of elongate square bars of said coupler means into nested engagement.

6. A power shaft coupling as in claim 5 wherein the pointed end on each bar is formed as a line of intersection of two outwardly facing planar surfaces which subtend therebetween an internal angle of approximately 90°.

7. A power shaft coupling as in claim 6 wherein said lines of intersection for each pair of elongate square bars fall substantially in the same plane.

8. A power shaft coupling as in claim 5 wherein said lines of intersection of each coupler means subtends an angle of about 60° to 80° with respect to the axis of rotation of the coupler means.

9. In a coupling for separately mounted and independently movable power shafts, complementary and substantially equivalent rotary coupler means at adjacent ends at each of said power shafts, stub shaft means universally connected to each power shaft, means non-rotatably connecting each coupler means to a stub shaft, each coupler means including a pair of elongate square bars mounted in aligned juxaposition on either side of the axis of rotation of its connecting stub shaft, adjacent longitudinal surfaces of each of said pairs of elongate square bars defining two-sided outwardly and oppositely facing pairs of slots, and guide means at the free outer ends of each of the pairs of elongate square bars of said separately mounted coupler means to guide the same into complementary nested engagement, whereby each pair of elongate square bars fits into the outwardly and oppositely facing slots of the other.

10. A coupling as in claim 9 wherein each power shaft is rotatably mounted within bearing means on a movable support, and each stub shaft is mounted within bearing means flexibly and movably mounted with respects to said movable support.

11. In an automatic power shaft coupling for two or more trailing vehicles, means to ensure effective through drive shaft coupling in varying angular positions of said trailing vehicles, said means comprising rotatably power shaft means on each trailing vehicle, stub shaft means rotatably and universally connected to said power shaft means at each end of a trailing vehicle, flexible means at either end of said trailing vehicle holding said stub shafts in a normal position of horizontal alignment with said power shaft, tow bar means at each end of said trailing vehicle, means to maintain alignment between adjacent stub shaft and tow bar means at each end of said trailing vehicle, and complementary and mating coupler means non-rotatably supported on each of said stub shaft means, each said complementary mating coupler means including a pair of elongate square bars mounted in aligned juxaposition on either side of the axis of rotation of its supporting stub shaft, said elongate square bars having free outer ends, and guide means at the free outer ends of each of said pair of elongate square bars to guide the same into complementary nested engagement with corresponding elongate square bars carried by complementary mating coupler means of an adjacent trailing vehicle.

12. An automatic power shaft coupling as in claim 11 wherein said means to maintain the alignment between the stub shaft and tow bar means at each end of a trailing vehicle includes linkage means to the flexible support for said stub shaft means to maintain said flexible support in aligned steering relation to the tow bar means.

13. An automatic power shaft coupling as in claim 11 wherein adjacent longitudinal surfaces of each of said pair of elongate square bars define two-sided outwardly and oppositely facing pair of slots adapted to receive a pair of elongate square bars of an adjacent complementary and mating coupler means.

14. An automatic power shaft coupling as in claim 13 wherein said adjacent longitudinal surfaces of each of said pair of elongate square bars subtend an angle therebetween approximating 90°.

15. An automatic power shaft coupling as in claim 11 wherein said guide means at the free outer ends of each of said pair of elongate square bars comprises a pair of outwardly facing planar surfaces which intersect along a line of intersection to provide pointed bar ends having compound angles.

16. An automatic power shaft coupling as in claim 15 wherein said intersecting planar surfaces of the bar ends subtends therebetween an internal angle of approximately 90°.

17. An automatic power shaft coupling as in claim 15 wherein the lines of intersection of said intersecting planar surfaces of each pair of elongate square bars fall substantially in the same plane.

18. An automatic power shaft coupling as in claim 17 wherein each of said lines of intersection of a coupler means subtends an angle of about 60° to 80° with respect to the axis of rotation of its supporting stub shaft.

* * * * *